Patented Mar. 28, 1944

2,345,237

UNITED STATES PATENT OFFICE 2,345,237

PIPERAZINO-PIPERAZINES

Henry C. Chitwood, Charleston, and Raymond W. McNamee, South Charleston, W. Va., assignors to Carbide and Carbon Chemicals Corporation, a corporation of New York No Drawing. Application October 24, 1941, Serial No. 416,372

12 Claims. (Cl. 260—268)

This invention pertains to certain saturated bicyclic compounds having heterocyclic ring systems composed of nitrogen and carbon atoms and it includes processes for making these compounds.

The cyclic structure characterizing the present compounds has not heretofore been known. It may be termed a piperazino-piperazine ring system having the structure:

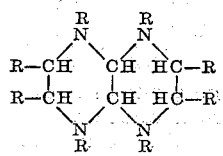

where R is hydrogen or a monovalent hydrocarbon radical, such as an alkyl, alkenyl, cycloalkyl, aralkyl, or aryl radical. For instance, R may be a methyl, ethyl, propyl, butyl, 2-ethyl butyl, allyl, cyclohexyl, benzyl, butenyl, or phenyl radical.

In the above formula, when R is hydrogen, the compound naphthopiperazine, 2,3-diaminoethylene piperazine, is represented. This compound is a slightly basic, white, crystalline solid, melting with decomposition at 232° to 234° C. It is soluble in water to a high degree, moderately soluble in ethanol, very slightly soluble in ammoniacal or alkaline solutions, and it is substantially insoluble in acetone or ether. The compound is slowly hydrolyzed by hot water and rather easily hydrolyzed in the presence of dilute mineral acids.

Piperazino-piperazine appears to be useful in the preparation of dyes, as well as pharmaceuticals, medicinal products and insecticides. Its condensation products with aldehydes are of potential value as accelerators for the vulcanization of rubber. Finally, since piperazino-piperazine contains a plurality of reactive nitrogen atoms, it may form a useful ingredient in synthetic resins, particularly in condensation products of the urea-formaldehyde type.

Piperazino-piperazines may be formed by the condensation of glyoxal with ethylene diamine, or substituted ethylene diamines, such as propylene diamine, or symmetrical N, N' disubstituted ethylene diamines, such as N, N' dibutyl ethylene diamine, according to the following scheme:

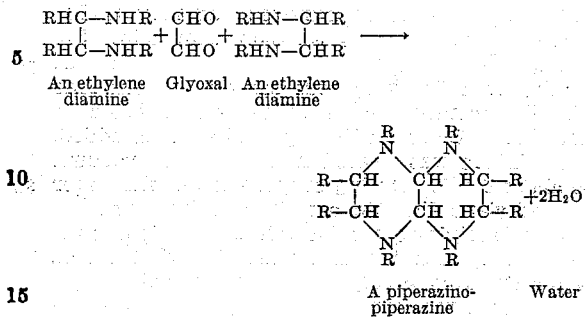

The term "an ethylene diamine" as employed in the specification and in the claims includes substituted ethylene diamines as well as ethylene diamine itself, as indicated above.

The products formed according to this invention are to be distinguished from those reported in the literature. Kolda, Monatshefte für Chemie 19, 623, heated together equimolar quantities of glyoxal and ethylene diamine and obtained a product which he described as a yellowish brown laminated solid melting at 146° C. and to which he assigned the empirical formula $C_8H_{14}ON_4$. The structural formula proposed by Kolda for his product contained an eleven-membered ring. We have found that if a greater molar quantity of the diamine than of glyoxal is employed, piperazino-piperazines are formed. A slight excess of the amine is effective to induce the formation of at least a small quantity of a piperazino-piperazine, but the yields of these compounds are greatly increased if at least two mols of an ethylene diamine are employed per mol of glyoxal.

The process may be carried out by using pure or substantially pure reactants but, because the reaction is exothermic, it is conveniently conducted in the presence of solvents or diluents. Alcohol or water is a satisfactory solvent and the reaction is preferably carried out by adding an aqueous solution of glyoxal to a concentrated aqueous solution of the amine. It is desirable at all times during the mixing of the reactants to maintain a substantial excess of the amine in contact with the glyoxal to minimize undesirable side reactions which produce tarry by-products. For this reason the preferred method of mixing is to add the glyoxal to the amine. In aqueous solution, glyoxal may exist as a hydrate, a polymer, or a hydrated polymer, possibly tetrahydroxy dioxane. The term "glyoxal substance" as used in this specification and in the appended claims includes those modifications of glyoxal which exhibit the reactive characteristics of this material and such modifications comprise aqueous solutions of glyoxal, as well as monomeric glyoxal, its hydrates, polymers and hydrated polymers.

The reaction between glyoxal substances and ethylene diamines to form piperazino-piperazines appears to proceed in two stages. During the first period heat is evolved and it is possible that an addition product of the amine and glyoxal is formed. It is advisable to cool the reactants upon their initial mixing. During the second period of the reaction, water is given off, and mild heating of the reactants at temperatures of 60° to 90° C. is desirable until the reaction is completed. If concentrated solutions of the reacting materials are present, the end of the reaction will be indicated by precipitation of the piperazino-piperazine formed.

*Example 1.*—Eleven hundred and fifty (1150) grams of an aqueous solution containing 348 grams (6 mols) of glyoxal was slowly added with cooling to a 70% aqueous solution of ethylene diamine (containing 24 gram-mols of ethylene diamine). When all the glyoxal had been added, the mixture was heated under a slight vacuum to about 90° C. During evaporation of the water and ethylene diamine, a white solid precipitated. As the precipitate became voluminous, it was recovered by filtering and washed with ethanol. After repeated precipitations and washings, 731 grams of a purified crystalline product was obtained which corresponds to a 85% yield. A small amount of material was not recovered from the ethanol wash liquor so that the actual yield was somewhat higher.

The product melted at 230° to 232° C. and it was identified as piperazino-piperazine having the structural formula:

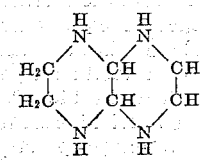

The nitrogen content of the new compound was found to be 39.35% by the Dumas method whereas the theoretical value for a compound of the above empirical formula is 39.40%. Further proof of the structure assigned to the new compound is shown by the fact that it may be hydrogenated to piperazine and ethylene diamine as described and claimed in the sole application Serial No. 416,353 of H. C. Chitwood.

*Example 2.*—A reaction between glyoxal and an excess of N, N', dibutyl ethylene diamine was conducted in a manner similar to the foregoing example. An aqueous solution of glyoxal and an alcoholic solution of the diamine were employed. The product obtained was a white crystalline solid which melted at 126–128° C. The compound was identified as N, N', N'', N''', tetrabutyl piperazino-piperazine. Analysis showed a nitrogen content of 15.2% as compared with the theoretical of 15.3% for tetrabutyl piperazino-piperazine.

*Example 3.*—Eleven hundred and fifteen (1115) grams of a 52% aqueous solution of glyoxal (10 mols) were added with stirring and cooling to 2600 grams of an 85.5% aqueous solution of propylene diamine (30 mols). After heating the mixture for 1.5 hours at 85° C., one liter of dioxane was added and the heating was continued for one hour. A large white crystalline precipitate was obtained which, after washing twice with acetone and drying, amounted to 1412 grams, corresponding to a yield of 83%.

The compound was identified as dimethyl piperazino-piperazine by hydrolysis with a measured excess of acid and back titration of the excess acid. The observed equivalent weight of the compound by this method was 45.9, as compared with the theoretical value of 42.5 for dimethyl piperazino-piperazine, showing that the compound was the reaction product of two mols of propylene diamine and one mol of glyoxal. The compound charred without melting at 210° C.

Modifications of the method of preparation of the piperazino-piperazines as shown in the foregoing examples and the synthesis of other compounds containing the piperazino-piperazine ring system will be apparent to those skilled in the art and are included within the scope of the invention.

We claim:

1. As new chemical compounds, piperazino-piperazines of the molecular structure:

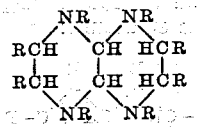

where R is of the group of hydrogen and monovalent hydrocarbon radicals.

2. As new chemical compounds, piperazino-piperazines of the molecular structure:

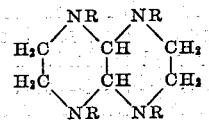

where R is an alkyl radical.

3. Piperazino-piperazine being a crystalline solid of the molecular structure:

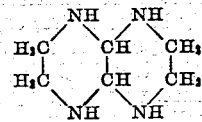

4. As a new chemical compound, N, N', N'', N'''-tetrabutyl piperazino-piperazine of the molecular structure:

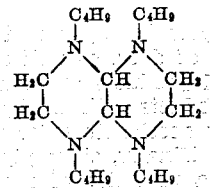

5. As a new chemical compound, a dimethyl piperazino-piperazine being the condensation product of two mols of propylene diamine and one mol of glyoxal.

6. Process for making piperazino-piperazines which comprises reacting a glyoxal substance with a molar quantity of an ethylene diamine in substantial excess of the glyoxal substance.

7. Process for making piperazino-piperazines which comprises reacting a glyoxal substance with at least two mols of an ethylene diamine per mol of reactive glyoxal.

8. Process for making piperazino-piperazines which comprises slowly adding a glyoxal substance to a substantially greater molar quantity of an ethylene diamine in the presence of an inert liquid.

9. Process for making piperazino-piperazine which comprises reacting a glyoxal substance with a molar quantity of ethylene diamine in substantial excess of the glyoxal substance.

10. Process for making piperazino-piperazine which comprises reacting a glyoxal substance with at least two mols of ethylene diamine per mol of reactive glyoxal.

11. Process for making N, N', N'', N'''-tetrabutyl piperazino-piperazine which comprises reacting a glyoxal substance with a molar quantity of N, N' dibutyl ethylene diamine in substantial excess of the glyoxal substance.

12. Process for making dimethyl piperazino-piperazine which comprises reacting a glyoxal substance with a molar quantity of propylene diamine in substantial excess of the glyoxal substance.

HENRY C. CHITWOOD.
RAYMOND W. McNAMEE.

CERTIFICATE OF CORRECTION.

Patent No. 2,345,237.   March 28, 1944.

HENRY C. CHITWOOD, ET AL.

It is hereby certified that error appears in the printed specification of the above numbered patent requiring correction as follows: Page 1, first column, line 25, for "naphthopiperazine, 2,3-diamino-" read --piperazino-piperazine, 2,3-dimino- --; and that the said Letters Patent should be read with this correction therein that the same may conform to the record of the case in the Patent Office.

Signed and sealed this 23rd day of May, A. D. 1944.

(Seal)

Leslie Frazer

Acting Commissioner of Patents.